United States Patent [19]

Rumpel

[11] Patent Number: 4,457,536
[45] Date of Patent: Jul. 3, 1984

[54] INDEPENDENT REAR WHEEL SUSPENSION WITH ADJUSTABLE TOE ANGLE CONTROL DURING RECESSION

[75] Inventor: Manfred Rumpel, Birmingham, Mich.

[73] Assignee: Ford Motor Company, Dearborn, Mich.

[21] Appl. No.: 535,541

[22] Filed: Sep. 23, 1983

Related U.S. Application Data

[63] Continuation of Ser. No. 334,332, Dec. 24, 1981, abandoned.

[51] Int. Cl.$^3$ ............................................. B60G 7/02
[52] U.S. Cl. ................................... 280/663; 280/666; 280/670; 280/672
[58] Field of Search ............... 280/660, 663, 666, 667, 280/670, 672, 673, 675, 702, 705, 711, 714, 724, 726; 267/66; 180/73 R, 73.4

[56] References Cited

U.S. PATENT DOCUMENTS

| | | | |
|---|---|---|---|
| 2,005,513 | 6/1935 | Weaver | 280/726 |
| 2,070,775 | 2/1937 | Bell | 280/666 |
| 2,171,157 | 8/1939 | Mathews | 280/660 |
| 2,305,820 | 12/1942 | Wagner | 280/666 |
| 2,842,230 | 7/1958 | MacPherson | 280/666 |
| 2,967,066 | 1/1961 | Mueller | 280/124 |
| 3,024,040 | 3/1962 | Müller | 280/660 |
| 3,177,965 | 4/1965 | Dews | 180/73 |
| 3,189,118 | 6/1965 | Arning | 180/73 |
| 3,202,237 | 8/1965 | Dreisziger | 180/73 |
| 3,573,882 | 4/1971 | Van Winsen | 280/124 |
| 3,603,422 | 9/1971 | Cordiano | 180/73 TL |
| 3,693,746 | 9/1972 | Yamamoto | 180/73 TL |
| 3,694,000 | 9/1972 | Van Winsen | 280/124 R |
| 3,759,542 | 9/1973 | Loffler | 280/124 A |
| 3,893,701 | 7/1975 | Kroniger | 280/124 A |
| 4,046,403 | 9/1977 | Yoshida | 280/701 |
| 4,245,853 | 1/1981 | Inoue et al. | 280/701 |
| 4,269,432 | 5/1981 | Inoue et al. | 280/690 |

FOREIGN PATENT DOCUMENTS 2249913 4/1974 Fed. Rep. of Germany .
2543189 4/1977 Fed. Rep. of Germany .

OTHER PUBLICATIONS

Ford Motor Company 1981 Model Shop Manual for Escort/Lynx Automobile, p. 14-32-1.

Primary Examiner—Robert R. Song
Attorney, Agent, or Firm—Jerome R. Drouillard; Roger L. May

[57] ABSTRACT

An independent rear wheel suspension for a motor vehicle having front wheel drive includes a telescopic strut rigidly mounted to a wheel support member and having its upper end pivotably mounted to the vehicle chassis. Two laterally extending control arms are pivotably connected at their outboard ends to the wheel support member and at their inboard ends to the vehicle chassis. The two control arms are longitudinally spaced apart. One arm has an integrally formed spring seat which seats a coil spring interposed between the arm and the vehicle chassis. One of the arms is mounted through two longitudinally spaced resilient bushings which controls the amount of wheel recession. In addition, the suspension can be constructed to control toe-in of the rear wheel during jounce of recession of the rear wheel.

14 Claims, 4 Drawing Figures

INDEPENDENT REAR WHEEL SUSPENSION WITH ADJUSTABLE TOE ANGLE CONTROL DURING RECESSION

This application is a continuation of application Ser. No. 334,332, filed Dec. 24, 1981, abandoned.

BACKGROUND OF THE INVENTION

1. Field of the Invention

This invention relates generally to independent wheel suspension systems for motor vehicles and more particularly to a strut type independent rear suspension for a front wheel drive vehicle.

2. Disclosure Information

Rear suspension systems have been constructed to control the attitude of the rear wheels in order to provide particular handling characteristics of the motor vehicle, for example roll understeer or roll oversteer, as well as to provide a soft ride free from road vibrations. Handling characteristics such as roll understeer, roll oversteer, or roll neutral steer during cornering of a motor vehicle are achieved by controlling the toe angle of one of the rear wheels during the jounce stroke of the suspension.

U.S. Pat. No. 3,177,965 issued Apr. 13, 1965 and U.S. Pat. No. 3,202,237 which issued Aug. 24, 1965 disclose rear wheel suspensions in which a single trailing arm, a transverse driving axle half-shaft and a strut-type telescopic shock absorber with an integral coil spring are combined to produce toe control during wheel jounce. U.S. Pat. No. 3,893,701 issued July 8, 1975 achieves a similar result through the use of a flexible semi-trailing arm arrangement. None of these patents is directed toward the control of toe angle during wheel recession.

A vibration free ride is enhanced if the rear wheels are allowed to recess when the wheel hits a bump. However, both wheel recession and steering stability must be taken into account when designing a rear suspension. One way to take both factors into account is by controlling the toe angle of the wheel during its recession.

U.S. Pat. No. 3,759,542 issued Sept. 18, 1973 and U.S. Pat. No. 4,269,432 each disclose the use in rear suspensions of dual transverse control arms in combination with a tension strut to control toe angle during jounce and recession. As distinguished from the present invention, neither of these citations indicate the possibility of controlling toe angle through the use of properly selected resilient bushings. To the contrary, both disclosures teach that the use of elastomeric or resilient bushings to mount suspension control arms will in of itself cause at least the partial loss of toe angle control during wheel displacement.

One way to control the toe angle of a wheel is with a suspension having two control arms substantially transverse to the longitudinal axis of the vehicle. The arms control the toe angle changes of the wheels as they shift positions.

However, previous usage of the two transverse control arms in combination with a strut suspension necessitated the spring element in the strut suspension to be mounted about the strut.

In many strut suspensions, the spring has been positioned away from the strut and interposed between a transverse control arm and the chassis so that the strut upper mounted can be constructed from softer rubber, and secondly, valuable cargo space or engine compartment space can be maximized.

SUMMARY OF THE DISCLOSURE

In accordance with the present invention, an independent rear wheel suspension for a vehicle includes a chassis, a wheel support member, a telescopic shock absorbing strut rigidly secured at its lower end to the wheel support member and connected at its upper end to the chassis, and control arms pivotably connected to the chassis and the wheel support member. The control arms are longitudinally spaced from each other and substantially transverse to the longitudinal axis of the motor vehicle. A spring seat is integrally formed with the front control arm for seating a bottom end of a coil spring. One of the transverse control arms is pivotably connected to the chassis by two longitudinally spaced resilient bushings. The two bushings can be constructed to allow lateral movement of the arm with respect to the chassis such that an effective pivot axis is formed between the two bushings. The bushings can be chosen to determine the position of the effective pivot axis. The effective pivot axis determines the rate of toe angle change with respect to recessive displacement of the wheel.

The broader aspects of the present invention are directed to a chassis, a wheel support member, and front and rear control arms which extend substantially transverse to the longitudinal axis of the chassis. The control arms are pivotably connected at their inboard ends and their outboard ends to the chassis and wheel support member, respectively. One of the control arms is pivotably connected to the chassis by two longitudinally spaced resilient bushings. The bushings can have different characteristics such as size and elastomeric material.

A suspension according to the present invention provides for increased cargo or engine space. Secondly, it allows the use of softer rubber in the strut upper mount. Furthermore, it provides the above features in a suspension that can provide roll understeer, roll oversteer, or roll neutral steer, as well as wheel recession. The toe angle rate of change of the wheel during wheel recession is predetermined, in part, by the relative displacement properties of the two resilient bushings connecting one of the arms to the chassis. Another aspect of the present invention provides for eliminating the necessity of a longitudinally extending link member to control the amount of wheel recession. Another aspect of the present invention provides a method for adjusting the toe angle rate of change during wheel recession of a vehicle suspension by changing one or both longitudinally spaced bushings with bushings having different characteristics.

BRIEF DESCRIPTION OF THE DRAWINGS

Reference is now made to the accompanying drawings in which:

FIG. 4 is a plan view similar to FIG. 2 showing the wheel suspension during wheel recession.

DETAILED DESCRIPTION OF THE PREFERRED EMBODIMENTS

Figure 1:
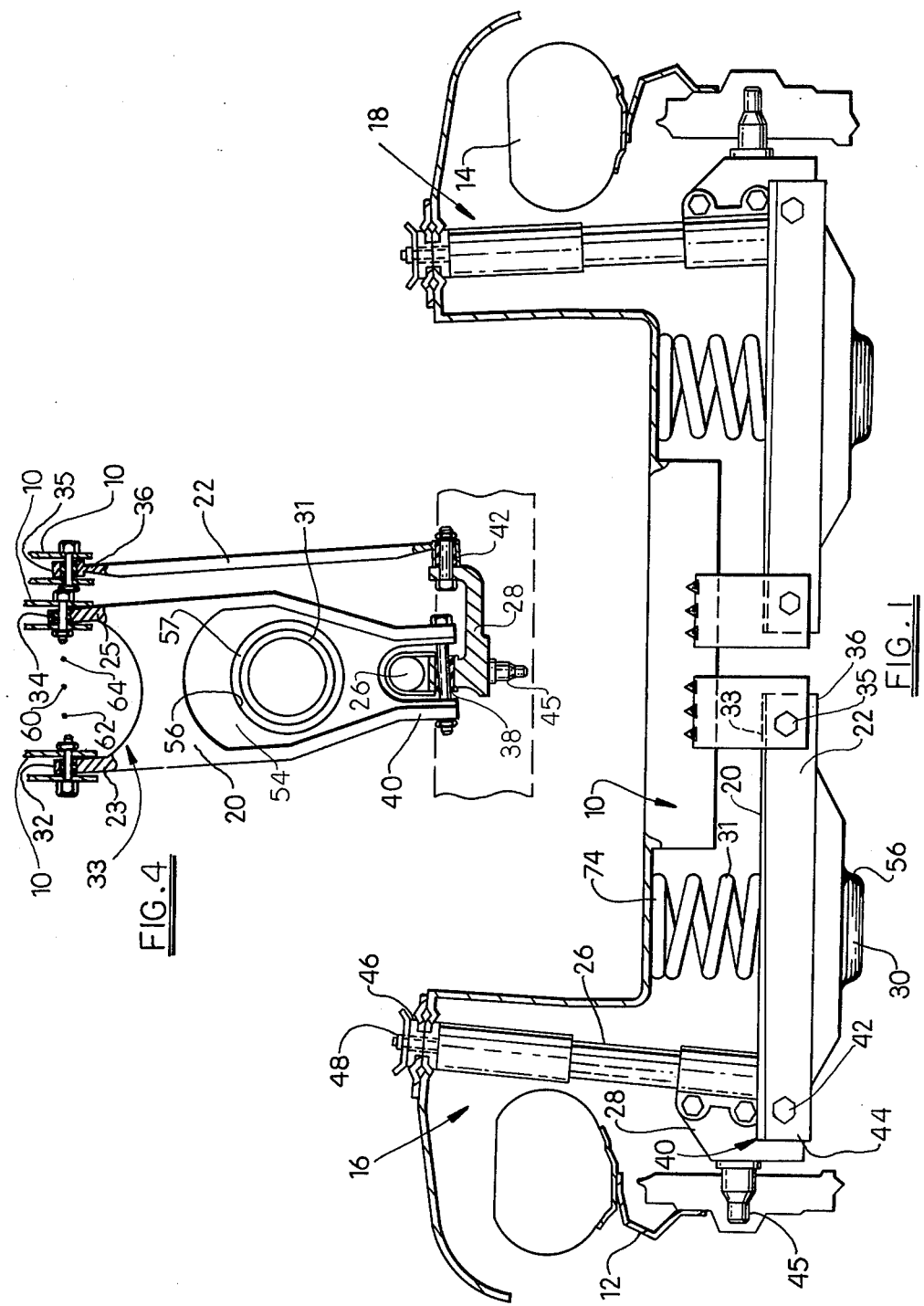
FIG. 1 is a rear elevational view, partly in section, of a motor vehicle incorporating independent rear wheel suspensions for its left and right rear wheels according to the invention.

Referring now to FIG. 1, a motor vehicle chassis (or unitized body and chassis) 10 is supported on left and right road wheels 12 and 14 by novel left and right independent wheel suspensions 16 and 18. Each wheel suspension 16 and 18 is identical except that one is a mirror image of the other; i.e., one is for the left side rather than for the right side. Since each indpendent suspension is the same, reference will only be made to the left wheel suspension 16.

Figure 2:
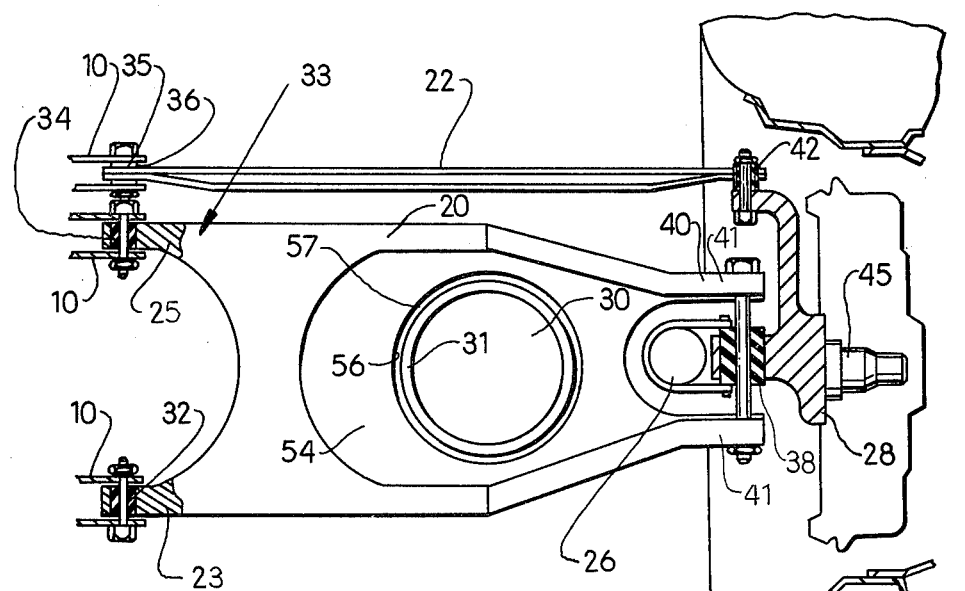
FIG. 2 is an enlarged plan view of the left rear wheel suspension shown in FIG. 1.
Figure 3:
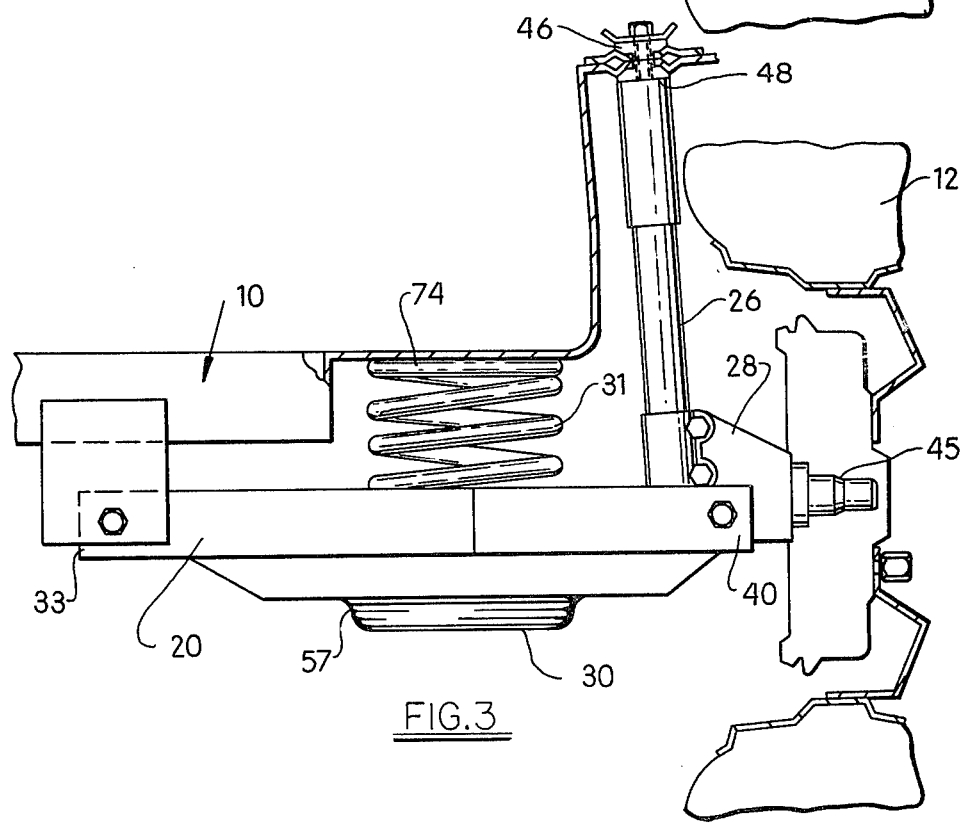
FIG. 3 is an enlarged front elevational of the left rear wheel suspension.

Generally, as shown in FIGS. 1, 2 and 3, the wheel suspension 16 includes a front transverse control arm 20, a rear transverse control arm 22, and a telescopic strut 26 which connects a wheel support member 28 to the motor vehicle chassis 10. Means are provided to pivotably connect the inner ends of the arms 20, 22 to the chassis 10 and their outer ends to the wheel support member 28, as will be described. A spring seat 30 is integrally formed in arm 20 and seats a coil spring 31 interposed between the seat 30 and chassis 10.

The front arm 20 has its inboard end 33 bifurcated into two stems 23 and 25 to receive two spaced apart bushings 32 and 34 which pivotably connect the arm 20 to chassis 10 about a horizontal axis. The rear arm 22 has a resilient bushing 35 at its inboard end 36 which pivotably connects the arm 22 to the chassis 10. An elastomeric bushing 38 pivotably connects the two prongs 41 of the outboard end 40 of the front control arm 20 to the wheel support member 28. Similarly, a resilient bushing 42 pivotably connects outboard end 44 of the rear control arm 22 to the wheel support member 28.

The wheel support member 28 has an integral wheel spindle 45 which rotatably mounts wheel 12. The spindle 45 is positioned longitudinally between the two stems 23 and 25 of the inboard end 33. Additionally, the spindle is positioned between the two prongs 41 of the outboard end 40 of arm 20 and is longitudinally aligned with bushing 38. The wheel support member 28 is rigidly connected to the telescopic shock absorbing strut 26. The upper end 48 of the strut 26 is pivotably connected through a resilient upper mount 46 to the chassis 10.

The spring seat 30, as shown in FIG. 2, is integrally formed with the front control arm 20 at a mid-position between the inboard end 33 and outboard end 40 of the arm 20. The spring seat 30 is recessed downwardly from the central area 54 and connected thereto by a downwardly extending wall section 56. In general, the recessed seat 30 forms a pocket 57 which receives the lower end of coil spring 31 as it is seated against seat 30.

The top end 74 of coil spring 31 is seated against the chassis 10 so that the coil spring 31 normally exerts a downwardly biasing force on the spring seat 30 and control arm 20 when the vehicle is at rest.

When the control arms 20 and 22 undergo jounce movement, the arms 20 and 22 pivot upwardly about the inboard bushings 32, 34 and 35. As the arms 20 and 22 pivot upwardly, the spring seat 30 is moved upward with the arm 20 to compress coil spring 31.

Similarly, when the control arms 20 and 22 undergo rebound movement and pivot downwardly about inboard bushings 32, 34, and 35, the spring seat 30 moves downwardly and allows coil spring 31 to elongate.

Arms 20 and 22 and the other suspension components may be arranged to provide an increase in toe-in during jounce of wheel 12. Alternatively, no toe change or toe out may be provided during jounce of wheel 12. One skilled in the art can provide the appropriate geometry of the various suspension arms that will provide the desired toe angle changes during jounce.

The plurality of resilient bushings in the suspension system allow the road wheel to recess when subjected to a longitudinal force such as occurs when the wheel strikes a road obstacle (e.g., a tar strip in concrete pavement). As shown in FIG. 4, the control arms 20 and 22 control the toe angle of the rear wheel 12 during recession of the wheel. Arms 20 and 22 and the other suspension components may be arranged to provide no toe change during recession of the wheel. Alternatively, the arms 20 and 22 may be arranged to provide toe-in as the wheel undergoes recession.

The control arm 20 controls the amount of recession due to its two spaced resilient bushings 32 and 34 without the use of a tie rod (or trailing arm). Bushings 32 and 34 are resilient to allow the arm 20 limited pivotable motion about a vertical axis. The amount of recession desired may be determined by the appropriate choice of elastomeric material for use in 32 and 34. In addition, the amount of recession is determined by the spacing of the bushings 32 and 34. The closer the bushings are together, the more recession is allowed.

In addition to or in substitution of the geometrical structure of the control arms to obtain toe angle change during recession, toe angle change can be affected by the appropriate choice of bushings 32 and 34. Bushing 32 can be chosen to be identical or different from bushing 34 such that the ratio of the amount of lateral displacement per amount of laterally directed forces exerted on bushing 32 can be higher, lower or the same as the ratio for bushing 34. The choice can be determined by the desire to have toe out, no toe angle change, or toe in during wheel recession.

For example, if the bushings 32 and 34 are identical, stems 23 and 25 undergo lateral displacement in equal amounts in opposite directions. Consequently, the effective pivot point of arm 20 with respect to chassis 10 during recession is midway between the two bushings 32 and 34 (as indicated by numeral 60 in FIG. 4). On the other hand, for example, if bushing 32 is chosen to be stiffer (i.e., have a lower above-identified ratio) than bushing 34 stem 23 undergoes less lateral displacement than stem 25 and the effective pivot point of arm 20 with respect to chassis 10 during recession is located closely to bushing 32. Conversely, if bushing 32 is chosen to be softer (i.e., have a higher above-identified ratio) than bushing 34, the effective pivot point of arm 20 with respect to chassis 10 during recession is located more closely to bushing 34.

The movement of the effective pivot point between arm 20 and chassis 10 affects the toe angle change of the suspension during recession. The more forward the effective pivot point is located, the tendency of the suspension to produce toe-in during recession is enhanced. Conversely, the more rearward the effective pivot point is located, the tendency of the suspension to produce toe-in is lessened.

More particularly, in the suspension 16 where the arms 20 and 22 have the same lateral length and are parallel to each other, as viewed from above or below, the location of the effective pivot point at a midpoint (as shown by number 60 in FIG. 4) between the bushings 32 and 34 and aligned with bushing 38 produces no toe angle change to the wheel during recession as shown. If bushing 32 is stiffer than bushing 34, the pivot point is moved forward of the midpoint for example at location 62. The recessive motion of arm 20 then produces toe-in of the wheel.

There may be occasions when the geometry of the suspension produces excessive toe-in during recession which may be counteracted in part by locating the effective pivot point behind midpoint 60, for example at location 64. The effective pivot point can be located at point 64 by having bushing 34 being stiffer than bushing 32.

If the toe angle rate of change for a particular suspension is desired to be adjusted, the adjustment can be easily done by replacing one or both of the bushings 32 and 34 with a bushing of different characteristics. For example, if the bushings 32 and 34 are identical, bushing 34 can be replaced with a softer one, bushing 32 can be replaced with a stiffer one, or both mentioned replacements can be made. The above replacements give the suspension an increased toe-in rate or lessened toe-out rate. Vice versa, the bushing 34 can be replaced with a stiffer bushing, bushing 32 can be replaced by a softer bushing, or both mentioned replacements can be made. This aforementioned set of replacements produces a lessened toe-in rate.

As also shown in the figures, the position of the spring near the control arms rather than about strut 26 provides for increased cargo or engine space since the clearance about struct 26 can be minimized. Furthermore, because the spring loads arms 20 and 22 and not mount 46, softer rubber can be used in upper mount 46 than would otherwise be feasible.

In this fashion, the suspension as described provides for increased cargo or engine space, allows softer rubber to be used in the strut upper mount, and can be constructed to provide roll understeer, roll oversteer or roll neutral steer as well as wheel recession. In addition, wheel recession can be controlled in an efficient manner with a minimum number of parts and the toe angle ratio of change during recession can be controlled and adjusted.

Variations and modifications of the present invention are possible without departing from its spirit and scope as defined by the appended claims.

The embodiments in which an exclusive property or privilege is claimed are defined as follows:

1. An independent rear wheel suspension for a vehicle comprising:
   a chassis;
   a wheel support member;
   transversely extending front and rear control arms pivotably connected at their inboard ends to said chassis and at their outboard ends to said wheel support member;
   one of said control arms connected to said chassis through two longitudinally spaced resilient bushings.

2. An independent rear wheel suspension as defined in claim 1 further comprising:
   an upwardly extending telescopic shock absorber having its lower end rigidly secured to said wheel support member; and
   means pivotably connecting the upper end of said shock absorber to said chassis;

3. An independent rear wheel suspension for a vehicle comprising:
   a chassis;
   a wheel support member;
   transversely extending front and rear control arms pivotably connected at their inboard ends to said chassis and at their outboard ends to said wheel support member;
   one of said transversely extending arms being resiliently connected to said chassis by two longitudinally spaced resilient bushings;
   said two longitudinally spaced bushings being constructed to allow said one arm to pivot about a vertical axis as said wheel support member recesses to control in conjunction with said other transversely extending arm the toe angle of said wheel support member as said member recesses.

4. An independent rear wheel suspension as defined in claim 3 further comprising:
   a spring seat integrally formed with one of said front and rear control arms;
   said spring seat seating a spring interposed between said spring seat and said chassis.

5. An independent rear wheel suspension for a vehicle comprising:
   a chassis;
   a wheel support support member adapted to rotatably mount a wheel;
   an upwardly extending telescopic shock absorber having its lower end rigidly secured to said wheel support member;
   means pivotably connecting the upper end of said shock absorber to said chassis;
   a first transversly extending control arm pivotably connected at its inboard end to said chassis and at its outboard end to said wheel support member;
   a second transversely extending control arm positioned in front of said first control arm and pivotably connected at its inboard end to said chassis and at its outboard end to said wheel support member;
   one of said transversely extending control arms having its inboard end connected by two longitudinally spaced resilient bushings to said chassis;
   said two longitudinally spaced resilient bushings constructed to control the amount of wheel recession allowed for a given recessive force;
   said two longitudinally spaced bushings being constructed to allow said one control arm to pivot about a vertical axis as said wheel recesses to control in conjunction with said other arm the toe angle of said wheel as said wheel recesses.

6. A method for changing the toe angle rate of a rear wheel suspension during wheel recession in an independent rear wheel suspension comprising:
   a chassis;
   a wheel support member;
   transversely extending front and rear control arms pivotably connected at their inboard ends to said chassis and at their outboard end to said wheel support member;
   one of said transversely extending arms being resiliently connected to said chassis by two longitudinally spaced resilient bushings;
   said two longitudinally spaced bushings being constructed to allow said one arm to pivot about a vertical axis as said wheel support member recesses to control in conjunction with said other transversely extending arms the toe angle of said wheel support member as said member recesses;
   said method comprising the steps of:
   removing one of said two longitudinally spaced resilient bushings;

replacing said one removed bushing with another resilient bushing that has different resilient characteristics then said one removed bushing.

7. A method for changing the toe angle rate of a rear wheel suspension during wheel recession in an independent rear suspension comprising:

a chassis;

a wheel support member;

transversely extending front and rear control arms pivotably connected at their inboard ends to said chassis and at their outboard end to said wheel support member;

one of said transversely extending arms being resiliently connected to said chassis by two longitudinally spaced resilient bushings;

said two longitudinally spaced bushings being constructed to allow said one arm to pivot about a vertical axis as said wheel support member recesses to control in conjunction with said other transversely extending arms the toe angle of said wheel support member as said member recesses;

said method comprising the steps of:

removing said two longitudinally spaced resilient bushings;

replacing said removed bushings with another pair of resilient bushings that have different relative resilient characteristics than said removed bushings such that said vertical axis is moved farther away from the position of one of said bushings and closer to the position of the other of said bushings.

8. An independent rear wheel suspension for a vehicle comprising:

a chassis;

a wheel support member with an attached road wheel;

transversely extending front and rear control arms pivotably connected at their inboard ends to said chassis and at their outboard ends to said wheel support member;

one of said control arms being connected to said chassis through front and rear longitudinally spaced resilient bushings;

said longitudinally spaced bushings being of different relative stiffness so as to allow the control arm to which they are attached to pivot about a vertical axis as said wheel support member recesses so as to control in conjunction with said other transversely extending arm the toe angle of said road wheel.

9. The independent rear wheel suspension as claimed in claim 8 wherein said front arm is connected by said front and rear longitudinally spaced resilient bushings, said front bushing being of greater stiffness than said rear bushing whereby said front arm is allowed to pivot about a vertical axis during wheel recession in cooperation with said rear arm and said wheel support so as to urge said road wheel to toe in.

10. The independent rear wheel suspension as claimed in claim 8 wherein said front arm is connected by said front and rear longitudinally spaced resilient bushings, said front bushing being of lesser stiffness than said rear bushing whereby said front arm is allowed to pivot about a vertical axis during wheel recession in cooperation with said rear arm and said wheel support so as to urge said road wheel to toe out.

11. The independent rear wheel suspension as claimed in claim 8 wherein said rear arm is connected by said front and rear longitudinally spaced resilient bushings, said front bushing being of lesser stiffness than said rear bushing whereby said rear arm is allowed to pivot about a vertical axis during wheel recession in cooperation with said front arm and said wheel support so as to urge said road wheel to toe in.

12. The independent rear wheel suspension as claimed in claim 8 wherein said rear arm is connected by said front and rear longitudinally spaced resilient bushings, said front bushing being of greater stiffness than said rear bushing whereby said rear arm is allowed to pivot about a vertical axis during wheel recession in cooperation with said front arm and said wheel support so as to urge said road wheel to toe out.

13. The independent rear wheel suspension as claimed in claim 8 wherein said front bushing is of identical stiffness to said rear bushing whereby the toe angle of said road wheel will be urged to remain constant during recession of said road wheel.

14. The independent rear wheel suspension as claimed in claim 8 wherein said wheel support member is disposed longitudinally between said front and rear longitudinally spaced resilient bushings.

* * * * *